US012211399B2

(12) United States Patent
Batta

(10) Patent No.: US 12,211,399 B2
(45) Date of Patent: Jan. 28, 2025

(54) MODULAR SIGN BOARD WITH EMERGENCY WARNING SYSTEM

(71) Applicant: Gaurav Batta, Scottsdale, AZ (US)

(72) Inventor: Gaurav Batta, Scottsdale, AZ (US)

( * ) Notice: Subject to any disclaimer, the term of this patent is extended or adjusted under 35 U.S.C. 154(b) by 168 days.

(21) Appl. No.: 17/971,469

(22) Filed: Oct. 21, 2022

(65) Prior Publication Data

US 2023/0130639 A1 Apr. 27, 2023

Related U.S. Application Data

(60) Provisional application No. 63/270,574, filed on Oct. 22, 2021.

(51) Int. Cl.

*G06F 13/00* (2006.01)
*G09F 13/00* (2006.01)
*G09F 13/04* (2006.01)

(52) U.S. Cl.

CPC ............ *G09F 13/04* (2013.01); *G09F 13/005* (2013.01)

(58) Field of Classification Search

CPC .... G09F 13/04; G09F 13/005; G09F 13/0413; G09F 13/0418; G09F 7/06; G09F 13/0404; G09F 2013/222

See application file for complete search history.

(56) References Cited

U.S. PATENT DOCUMENTS

| | | | | |
|---|---|---|---|---|
| 2020/0361497 | A1* | 11/2020 | Hoppe | H04W 4/023 |
| 2021/0117915 | A1* | 4/2021 | Newcomb | G09F 7/00 |
| 2021/0183278 | A1* | 6/2021 | Lai | H04W 88/04 |
| 2023/0394999 | A1* | 12/2023 | Brooker | H05K 5/0247 |
| 2024/0087485 | A1* | 3/2024 | Mattingly | G09F 19/22 |

* cited by examiner

*Primary Examiner* — Cassandra Davis

(74) *Attorney, Agent, or Firm* — SNELL & WILMER, L.L.P.

(57) ABSTRACT

An address sign can consist of a rectangular enclosure with removable, illuminated alphanumeric characters attached to the front of the enclosure, an electronic control module positioned inside the enclosure, wherein the electronic control module includes a wireless communication unit configured to communicate with a series of electronic devices within a geographical area, and the electronic control module is configured to transmit signals to the illuminated alphanumeric characters.

8 Claims, 10 Drawing Sheets

MODULAR SIGN BOARD WITH EMERGENCY WARNING SYSTEM

CROSS REFERENCE TO RELATED APPLICATIONS

This application claims priority to and the benefit of U.S. Provisional Patent Application Ser. No. 63/270,574 filed Oct. 22, 2021, entitled "Modular sign board with wireless emergency warning system," the disclosure of which is incorporated herein by reference in its entirety for all purposes.

FIELD

The present disclosure relates to illuminated sign devices, emergency monitoring, and warning systems.

BACKGROUND

Regular signs outside houses display the address of the property for identification, but often times lack uniformity, contrast, and size, thus imparting an inconsistent general appearance that is often inadequately visible. The poor visibility of the alphabet characters and/or numbers can cause various issues for the inhabitants and any onlooker trying to search for an address.

In addition to poor visibility, most signs lack salient features that can facilitate not just high visibility but make the address instantly recognizable when the need arises.

SUMMARY

The present invention seeks to provide a solution to this problem(s) by providing a modular sign board device with connectors that allow for interchangeable numbers (or alphabetical characters) that can be attached to its front plate to represent any address by the user. The individual number units include a connector that can interface with the connector(s) of the front plate. The device can then provide electrical power to illuminate the numbers ensuring high legibility. The device is a smart device with built in circuitry for wireless signal transmission, and under certain conditions, allows the numbers, or front plate, or both to be illuminated in different colors and patterns to convey distress, attract attention, and be distinctly recognizable, such as in one embodiment flashing red and blue to indicate an emergency.

Preferably, the connectors are proprietary so as to ensure ingenuity, dissuade replication of similar functional equipment, and maintain closed system design and safety through complete control over design intent and expected performance in use.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
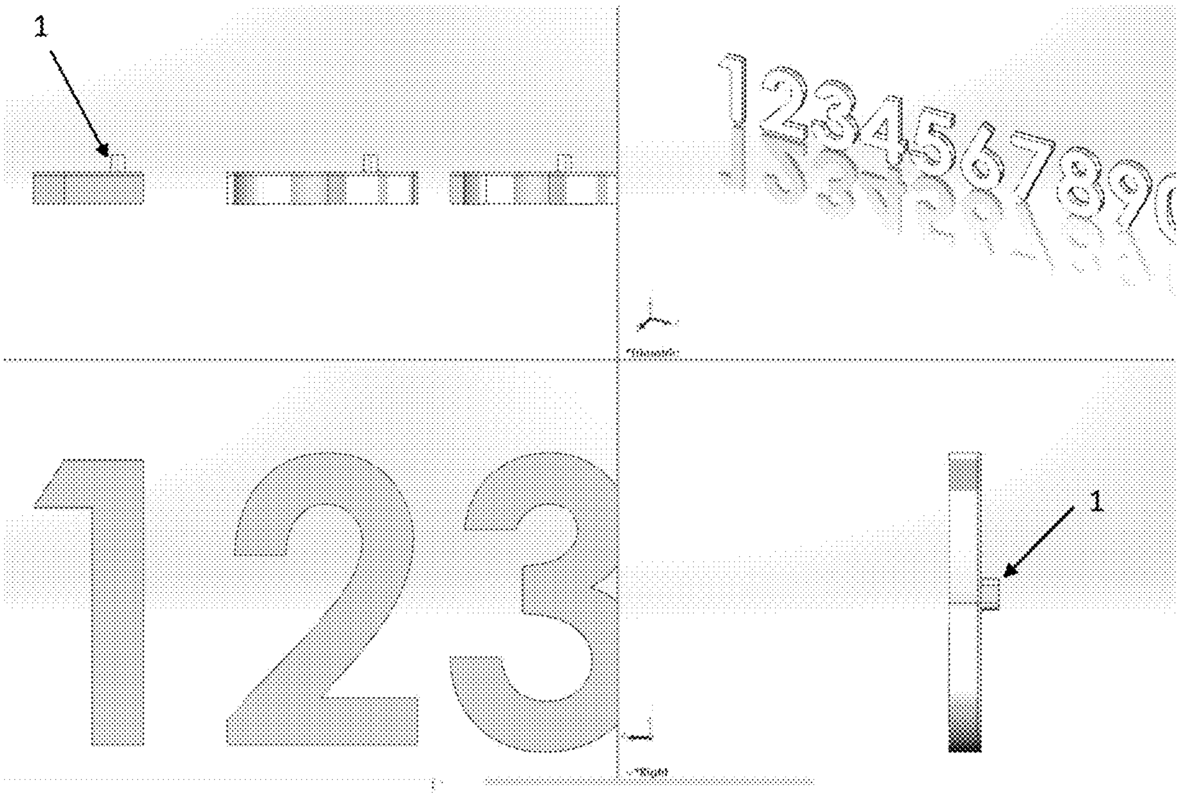
FIG. 1 illustrates an orthographic view of sample numbers according to one exemplary embodiment of the invention.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

Figure 2:
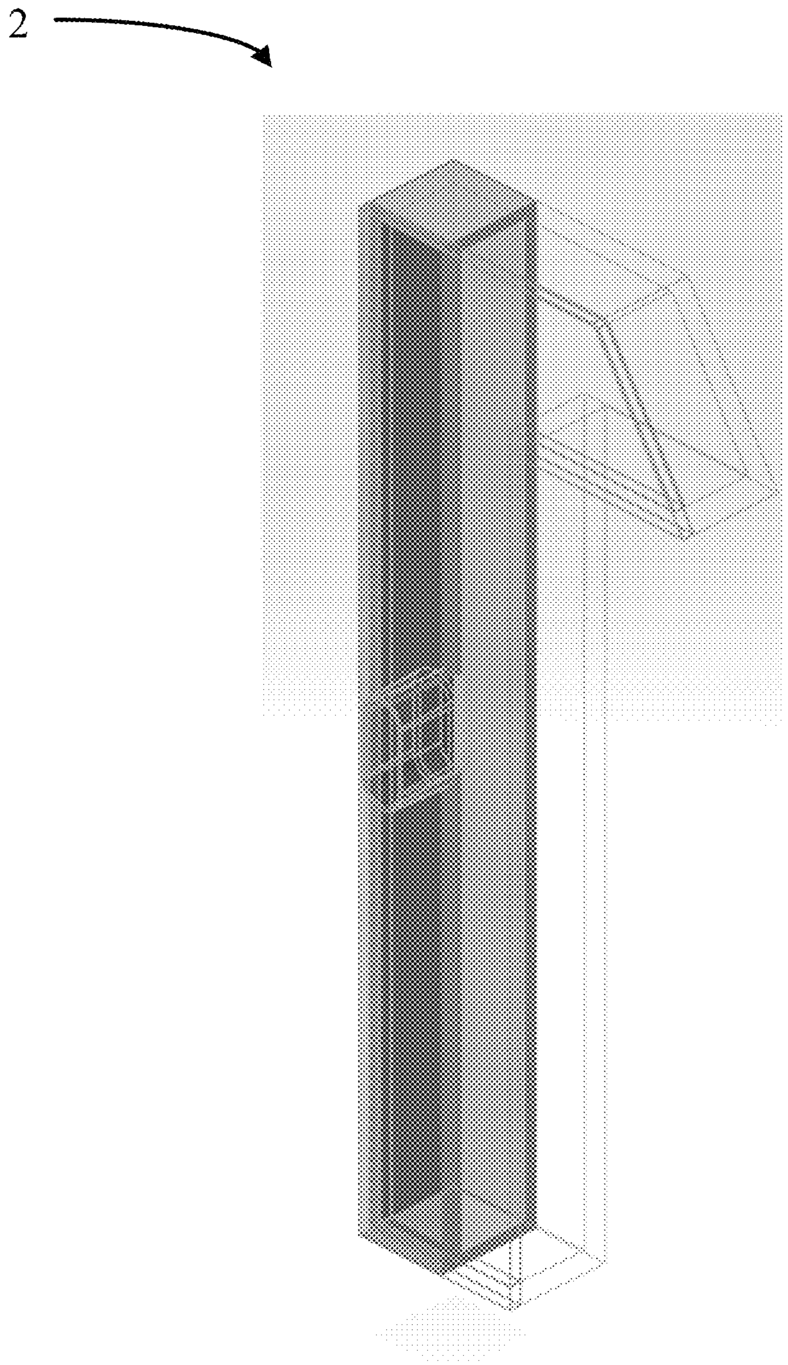
FIG. 2 illustrates a cross-sectional view from the back of a number according to one exemplary embodiment of the invention.

Referring to the drawings, there is shown a set of numbers in FIG. 1, highlighting a protrusion 1, that has the connector for the number 2, as shown in FIG. 2. The number 2 may instead be any other number, alphabet, or character, in any language, and is henceforth called number or character reflecting implementation as shown in current embodiment. The protrusion 1 enables the user to connect any desired number or character to the front-plate 3 and be held in place, similar to a plug and receptacle design. Preferably, number 2 is pre-fitted with a suitable light emitter, such as LED lights that can display red, green, blue, white or a combination of those. Preferably, the connector in protrusion 1 is proprietary with unique plug and receptacle to ensure safety and prevent misuse. Preferably, the plug and receptacle are shaped like a slot to assist with correctly orienting the number 2.

Figure 3:
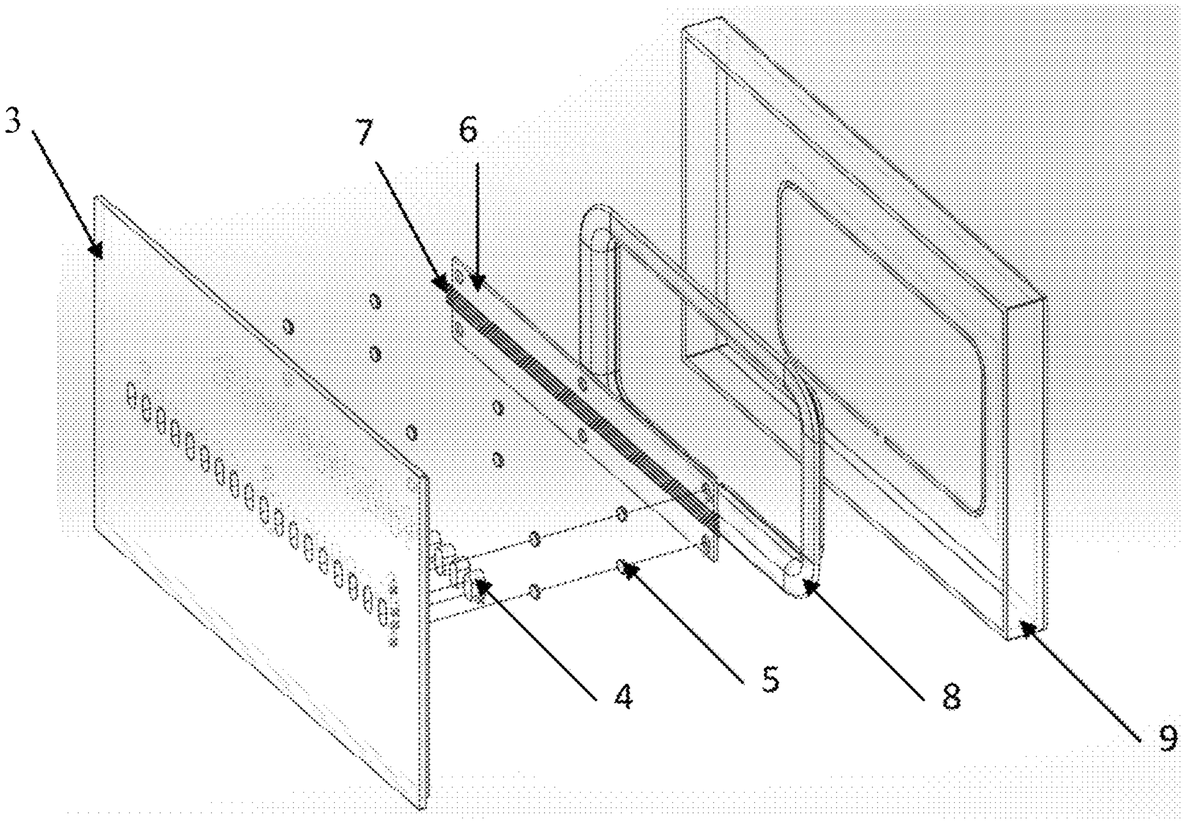
FIG. 3 illustrates an exploded-view of the enclosure according to one exemplary embodiment of the invention.
Figure 4:
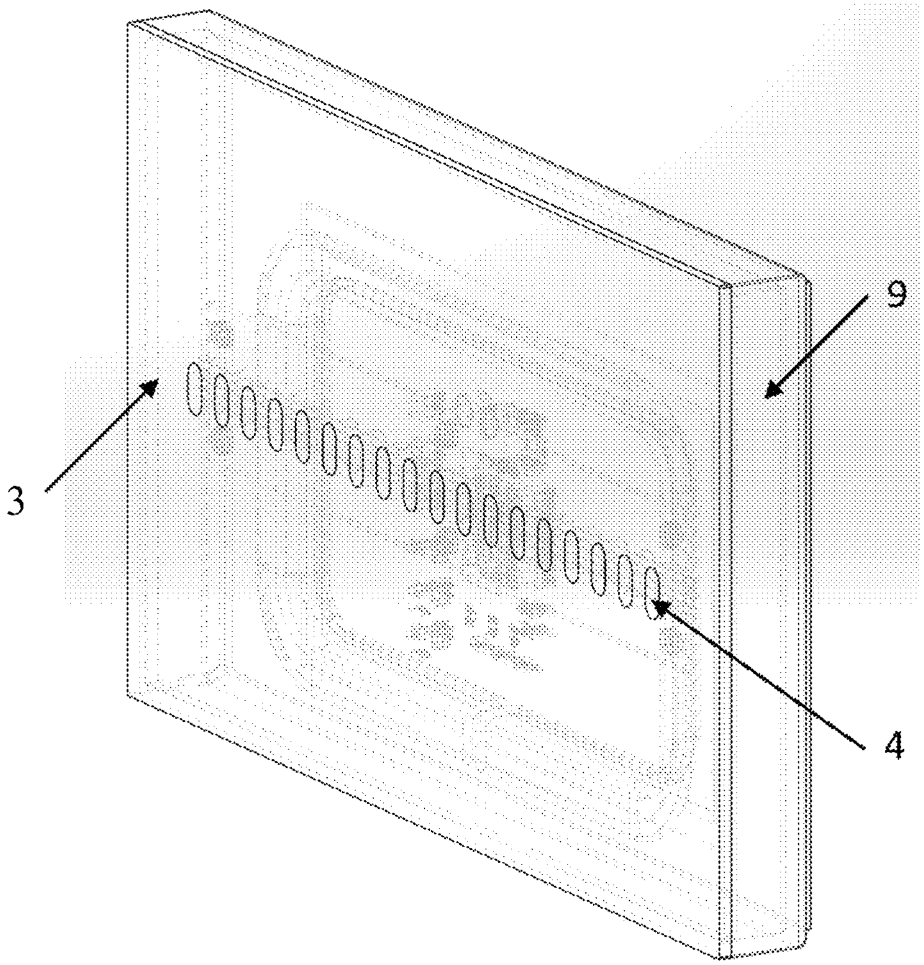
FIG. 4 illustrates the closed enclosure according to one exemplary embodiment of the invention.
Figure 5:
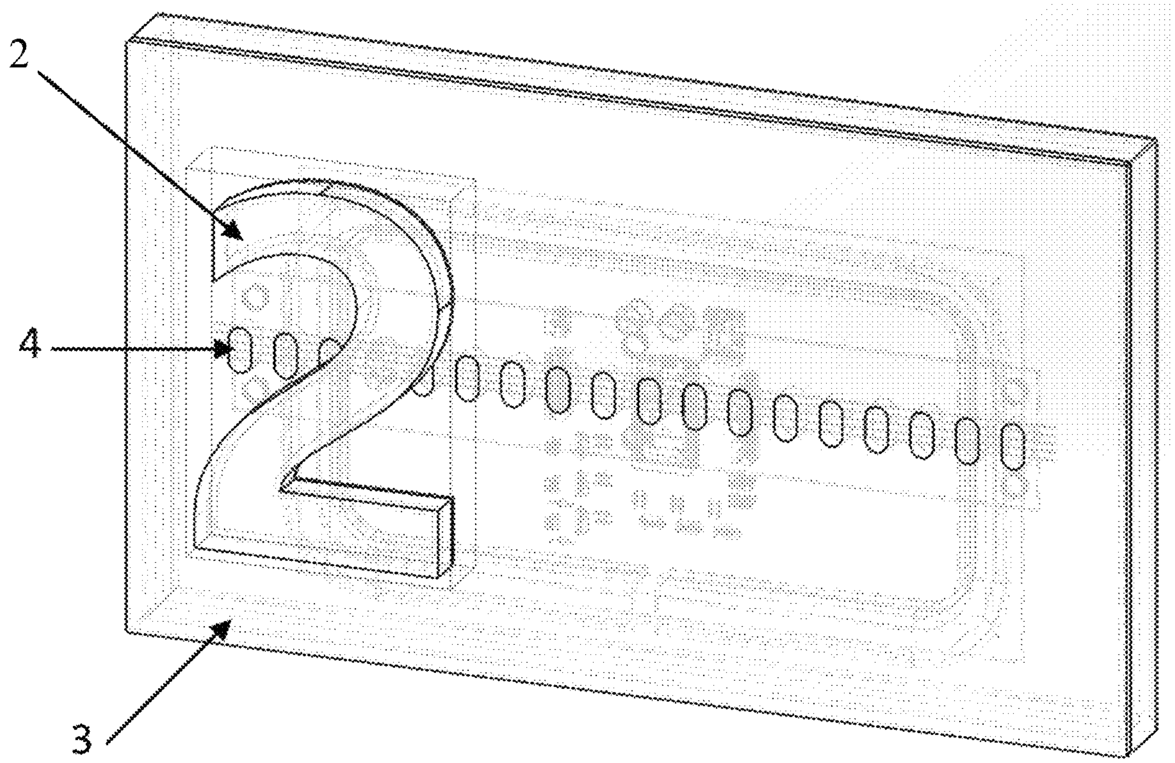
FIG. 5 illustrates a sample number removably coupled to the closed enclosure according to one exemplary embodiment of the invention.

The front-plate 3 features multiple slots as shown in FIG. 3, spaced across the front to function as potential receptacles for any number(s) 2 the user may plug in. Preferably, the slots are filled with nubs 4 as in FIG. 4 that sit flush with the front surface and are finished similarly so as to be virtually indistinguishable from the front plate unless inspected up close or more carefully. Thus, the user can space their desired number 2, by selectively removing nubs 4, while leaving remaining nubs intact. One such example of embodiment is presented in FIG. 5 that shows number "2" as number 2, plugged onto front-plate 3, occupying the space of fourth slot nub 4 with remainder slot nubs 4 left intact. The user can hence plug in as many or as few character(s) as they desire to assemble their desired combination subject to available space.

Figure 6:
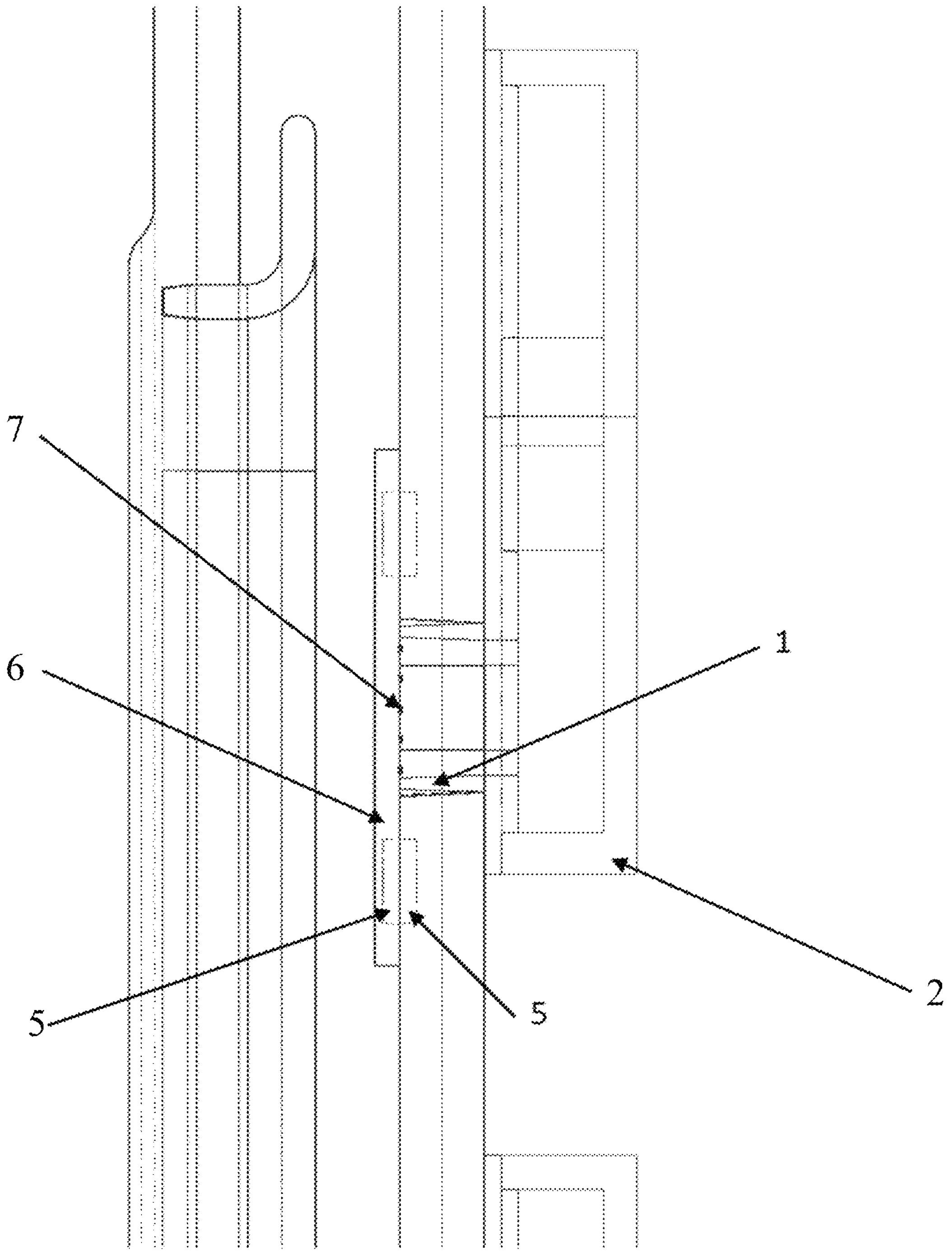
FIG. 6 illustrates a cross-sectional view of the enclosure with a sample number removably coupled to it according to one exemplary embodiment of the invention.
Figure 7:
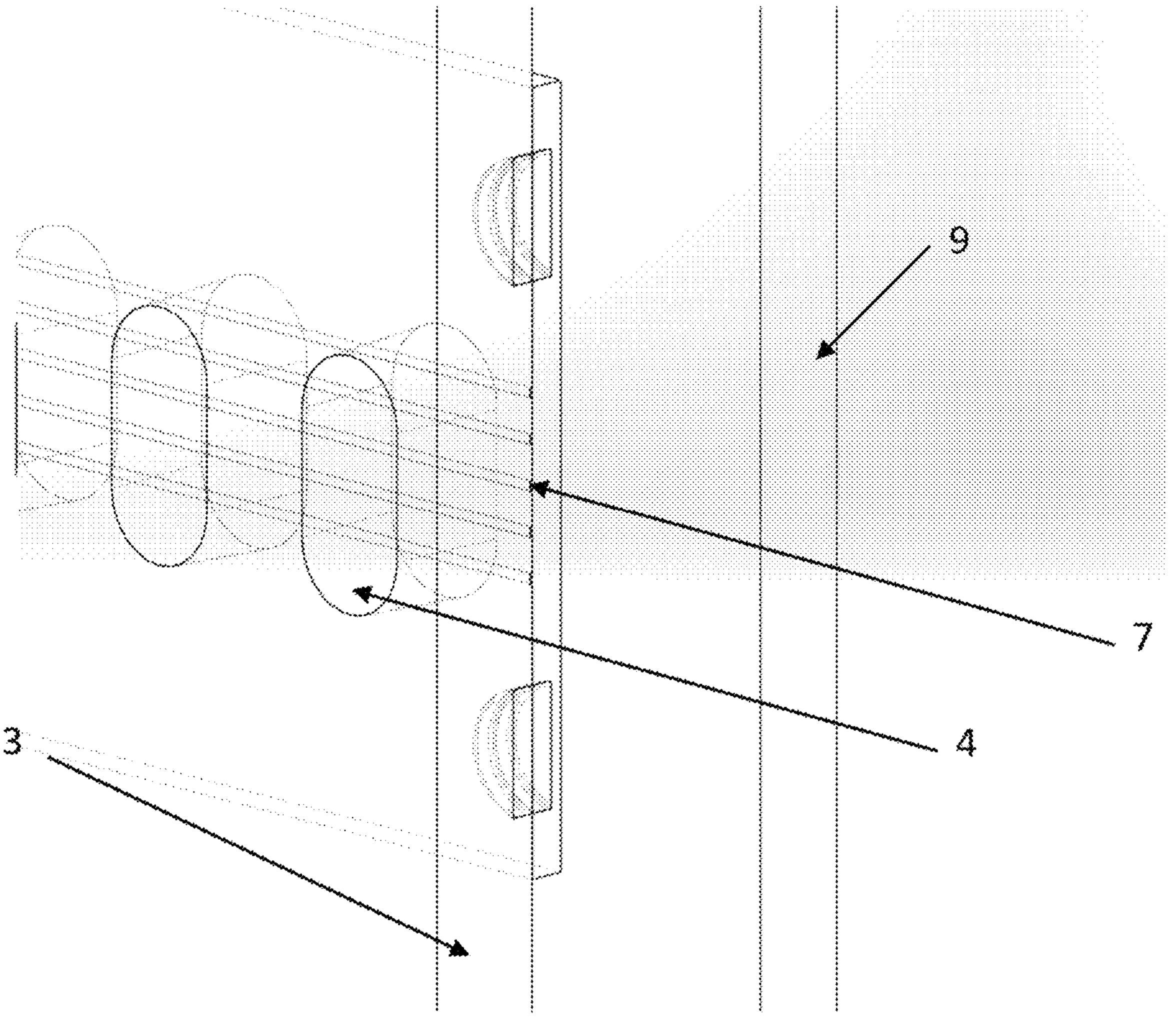
FIG. 7 illustrates a cross-sectional view of the front face of the enclosure according to one exemplary embodiment of the invention.

The protrusion 1 of the said number 2 is shown in cross section view in FIG. 6 plugged through space originally occupied by slot nub element 4, thereby aligning the connector contacts of protrusion 1 to conductor element 7. The conductor rail 6 facilitates interface as conductor element 7 spans across the slot nubs 4. Many implementations are possible to ensure transmission of power and any other signals from a conductor element to contacts. One such example is shown in FIGS. 6 and 7. Preferably, the conductor rail 6 is held in place with magnet(s) 5, enabling easy coupling and uncoupling as the user presses the number 2, thereby displacing the slot nub 4, which then uncouples conductor rail 6 as magnet(s) 5 are pushed farther apart.

Once the number(s) 2 have been plugged in as desired, the user can easily reattach connector rail 6 back in position, aligning conductor(s) 7 to interface with connector(s) in protrusion 1.

The conductor 7 connects to printed circuit board ("PCB") element 10, preferably by soldered and subsequently shielded joints. The PCB 10 is positioned next to the flat back-plate 9 of the enclosure. The PCB 10 controls the illumination of enclosure and characters and has wireless communication module such as ESP32 Wi-Fi module, that can wirelessly communicate with other mobile devices. Other modules may be incorporated onto the PCB 10, and the example provided is to communicate one embodiment of various electrical implementations. Thus, when the device is connected to a wireless network, it can detect other devices on the same network. A mobile application installed by the user on their communication devices not limited to examples such as, phones, watches, and home assistants, will then be able to monitor for emergency calls, such as to 911, within the scope of devices located in a geofence perimeter. Upon detection of an emergency call, the device will then be triggered, and the solid illumination of numbers will switch to red and blue illumination, preferably in flashing patterns to mimic ambulance or police vehicle light colors for a set amount of time, unless terminated by the user. Other patterns may be used, such as solid red illumination, and many other combinations are possible.

In another embodiment, a speaker may be added to the PCB 10 to emit auditory signal such as a siren to indicate emergency, with or without the emission of visual signals. An ambient light sensor may be added to facilitate automated illumination as it gets darker. While numerous features are possible and can be added using the current invention as a platform, it is not feasible to list all possible iterations and combinations, and the embodiment descriptions and limited examples of the instant disclosure in no way imply exhaustive scope of invention.

Figure 8:
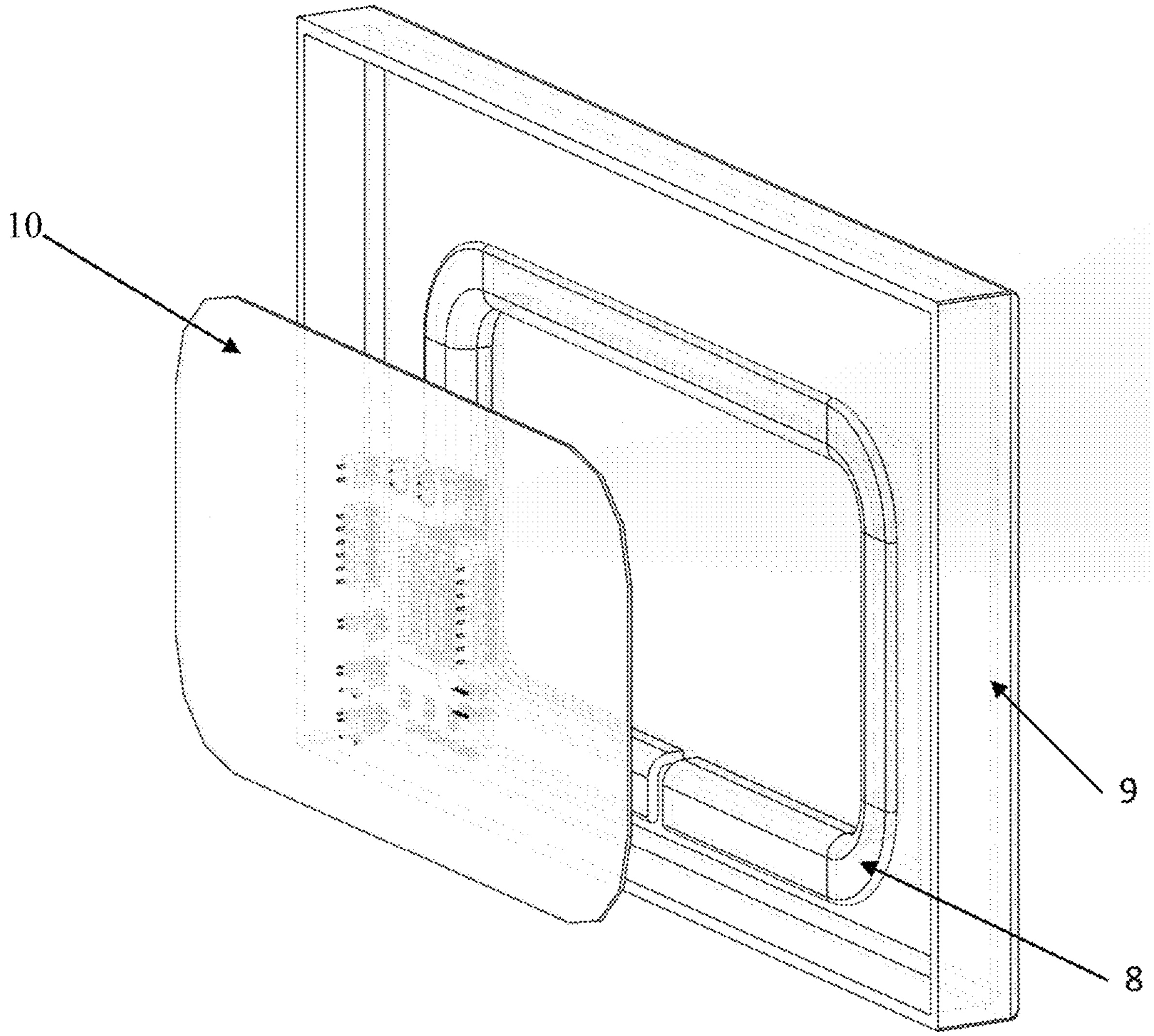
FIG. 8 illustrates an exploded-view of the electronic control module and flat back embodiment of the enclosure according to one exemplary embodiment of the invention.
Figure 9:
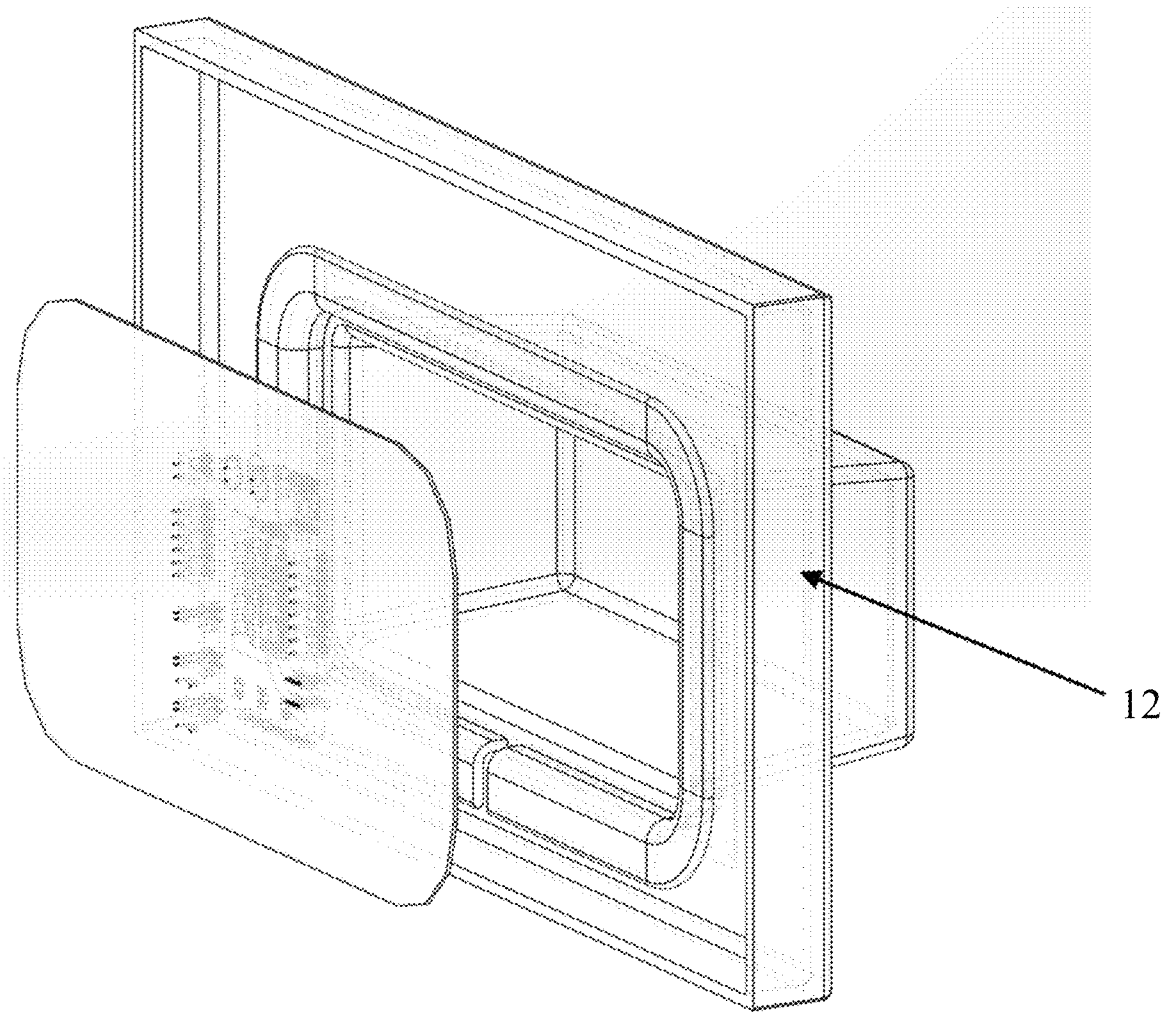
FIG. 9 illustrates an exploded-view of the electronic control module and the protruding back embodiment of the enclosure according to one exemplary embodiment of the invention.

In another embodiment, a protruding-back plate 12 as illustrated in FIG. 9 may be used in lieu of the flat-back plate 9 shown previously in FIG. 8. The protruding-back plate 12 as shown includes additional space to accommodate the power supply element 11 within the enclosure for the users who prefer the entire assembly to be situated in the same place and have adequate space available in a wall for installation.

The design with the flat-back plate 9 is better suited for users who would prefer situating power supply element 11 elsewhere to run a singular wire to the enclosure preventing the enclosure from excessively protruding outward from the wall, and/or from the need to carve space into a wall for installation.

Figure 10:
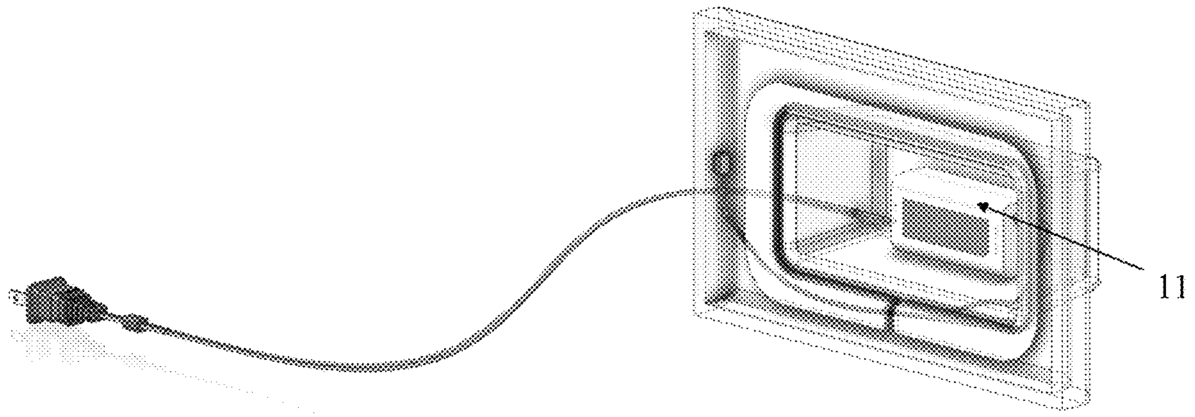
FIG. 10 illustrates the internally housed power supply embodiment of the enclosure according to one exemplary embodiment of the invention.

FIG. 10 illustrates power supply 11, as situated within the enclosure, but it may be placed outside the enclosure depending on user setup preferences, thus delivering power to the PCB element 10.

What is claimed is:

1. An address sign, comprising:

a rectangular enclosure having a front face, a back face, a first side wall, a second side wall opposite to the first side wall, a top, and a bottom, wherein the front face, the back face, the first side wall, the second side wall, the top, and the bottom together define a closed space;

a plurality of alphanumeric character units removably coupled to the front face, the plurality of alphanumeric character units including a plurality of light emitting devices disposed therein;

an electronic control module positioned inside the closed space, the electronic control module including a wireless communication unit configured to communicate with a plurality of electronic devices within a geographical area;

a conductor device removably coupled to the plurality of alphanumeric character units and the electronic control module and configured to transmit data from the electronic control module to the plurality of light emitting devices; and a power supply system.

2. The address sign of claim 1, wherein the plurality of light emitting devices comprises a plurality of color changing LED lights.

3. The address sign of claim 2, further comprising:

a speaker removably coupled to the electronic control module configured to emit a plurality of sounds.

4. The address sign of claim 3, further comprising:

detecting, via the electronic control module, a distress signal from the plurality of electronic devices; and transmitting, via the electronic control module, a command to at least one of the plurality of light emitting devices to change colors and the speaker to emit a sound.

5. The address sign of claim 4, wherein the detecting the distress signal is in response to an emergency call being made from the plurality of electronic devices.

6. The address sign of claim 1, wherein the geographical area is defined by a geofence.

7. The address sign of claim 1, wherein the power supply system is positioned inside the closed space.

8. The address sign of claim 1, wherein the power supply system is removably coupled to the rectangular enclosure.

* * * * *